US008355383B2

(12) United States Patent
Rastelli et al.

(10) Patent No.: US 8,355,383 B2
(45) Date of Patent: Jan. 15, 2013

(54) METHOD, SYSTEM AND DEVICES FOR SUPPORTING HANDOVER IN MOBILE COMMUNICATION NETWORKS

(75) Inventors: Marco Rastelli, Cesano Boscone (IT); Daniele Tortora, Sesto s. Giovanni (IT)

(73) Assignee: Nokia Siemens Networks Oy, Espoo (FI)

( * ) Notice: Subject to any disclaimer, the term of this patent is extended or adjusted under 35 U.S.C. 154(b) by 84 days.

(21) Appl. No.: 12/741,648

(22) PCT Filed: Nov. 7, 2008

(86) PCT No.: PCT/EP2008/065146
§ 371 (c)(1),
(2), (4) Date: Feb. 8, 2011

(87) PCT Pub. No.: WO2009/060076
PCT Pub. Date: May 14, 2009

(65) Prior Publication Data
US 2011/0182267 A1    Jul. 28, 2011

(30) Foreign Application Priority Data

Nov. 9, 2007    (EP) .................................... 07425703

(51) Int. Cl.
*H04W 36/00*    (2009.01)
(52) U.S. Cl. ......... 370/331; 370/360; 455/436; 455/439
(58) Field of Classification Search .................. 370/331; 455/525, 439, 436
See application file for complete search history.

(56) References Cited

U.S. PATENT DOCUMENTS

2005/0197124 A1*  9/2005  Kang et al. .................... 455/439
2009/0109923 A1*  4/2009  Kojima ......................... 370/331

FOREIGN PATENT DOCUMENTS

EP    1 571 786 A2    9/2005
EP    1 775 984 A2    4/2007

OTHER PUBLICATIONS

SAyeedi, Nov. 2007, "Target NS indication in MOB_HO-IND".*
Jee, J., et al., "Mobile IPv4 Fast Handovers for 802.16e networks draft-jee-mip4-fh80216e-01.txt", Jun. 3, 2009, XP-002518110, 13 pgs.
Sayeedi, S., et al., "Target BS indication in MOB_HO-IND" Nov. 4, 2007, XP-002518111, 3 pgs.
P802.16Rev2/D1 (Oct. 2007), "Part 16: Air Interface for Broadband Wireless Access Systems, DRAFT" © 2007 IEEE, pp. 1-25, 469-471, 1176-1181, 1187.

* cited by examiner

*Primary Examiner* — Dang Ton
*Assistant Examiner* — Pamit Kaur
(74) *Attorney, Agent, or Firm* — Harrington & Smith

(57) ABSTRACT

Handover of a mobile station (MS) from a serving base station (BS) to a target base station in a mobile communication system supporting both MS-initiated handover and BS-initiated handover, is coordinated by ensuring that, both in the case of BS-initiated handover and in the case of MS-initiated handover: the mobile station (MS) and the base station (BS) share information, either via a MO_BSHO-REQ message sent from the BS to the MS in the case of BS-initiated HO or via a MO_MSHO-RETQ message sent from the MS to the BS in the case of MS-initiated HO, indicating a target base station for the mobile station (MS) to attempt handover; and the mobile station (MS) sends an information message (M0B_H0-IND) indicating the base station to which handover was attempted.

17 Claims, 4 Drawing Sheets

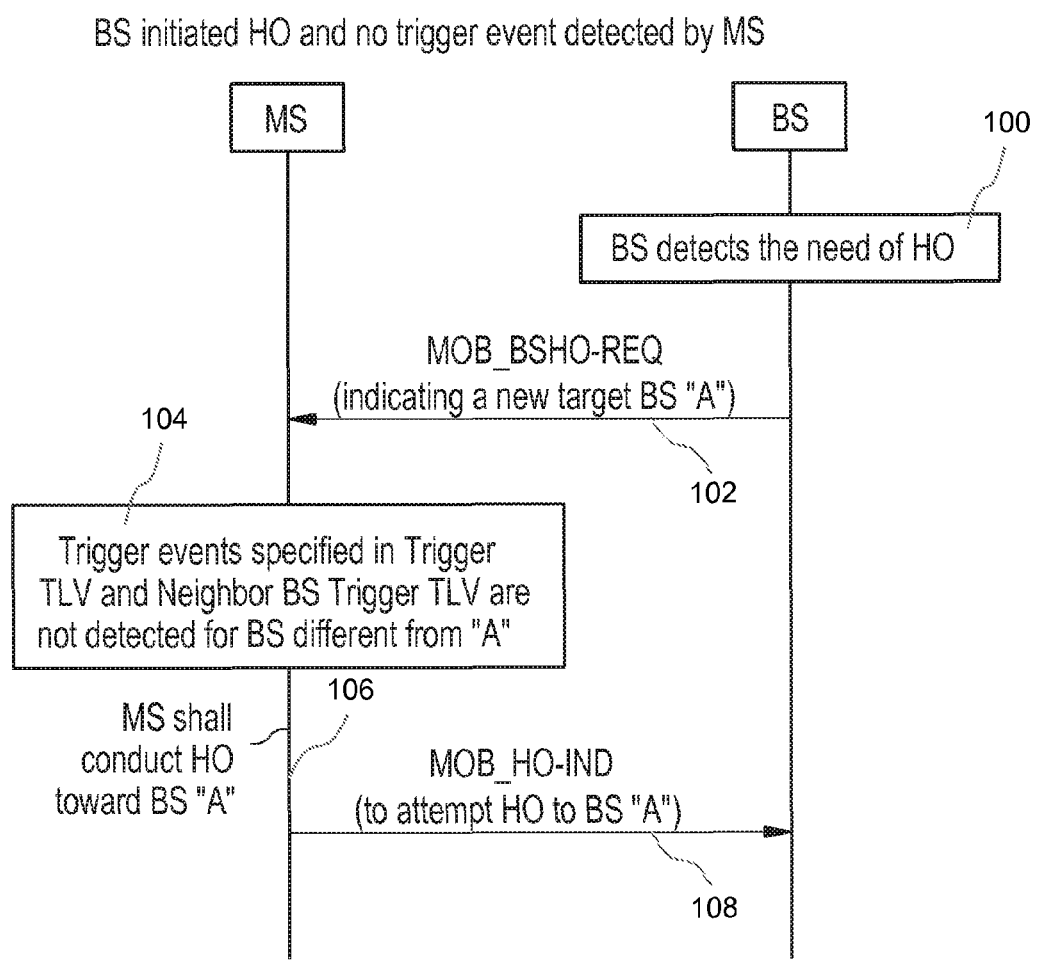

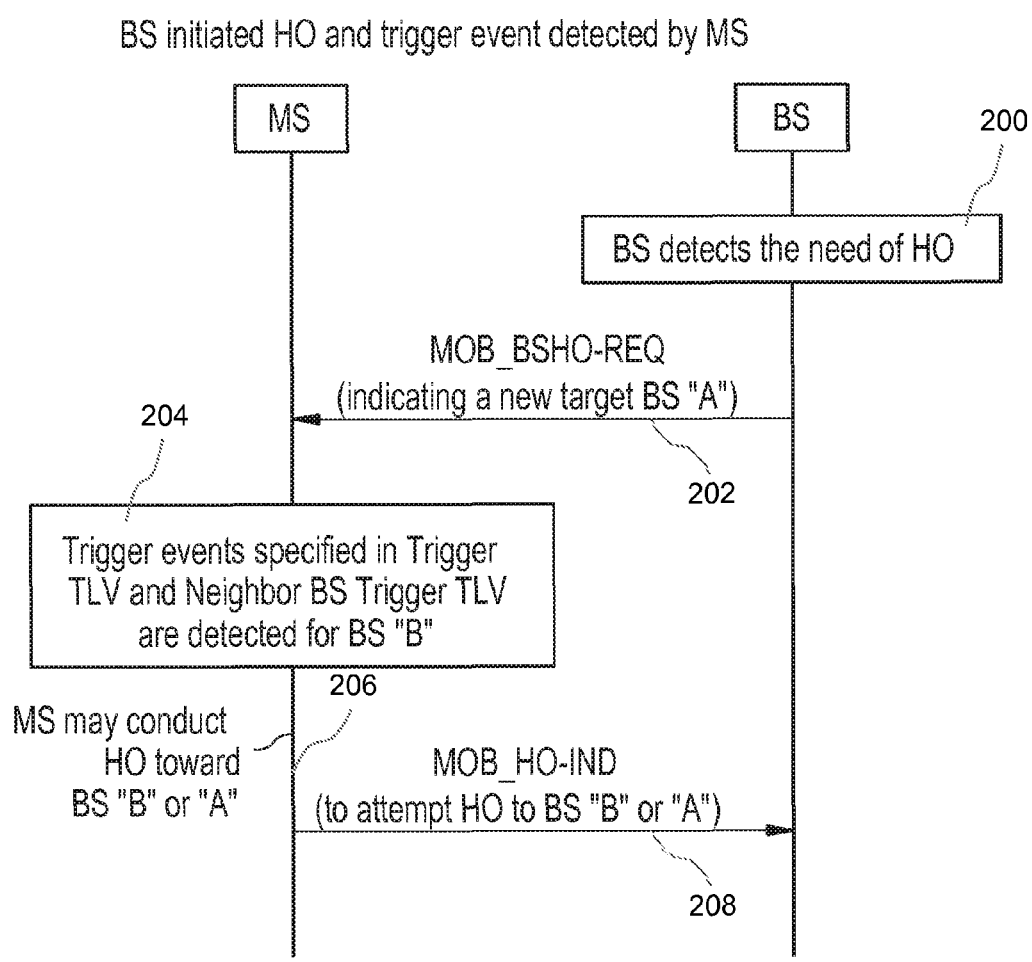

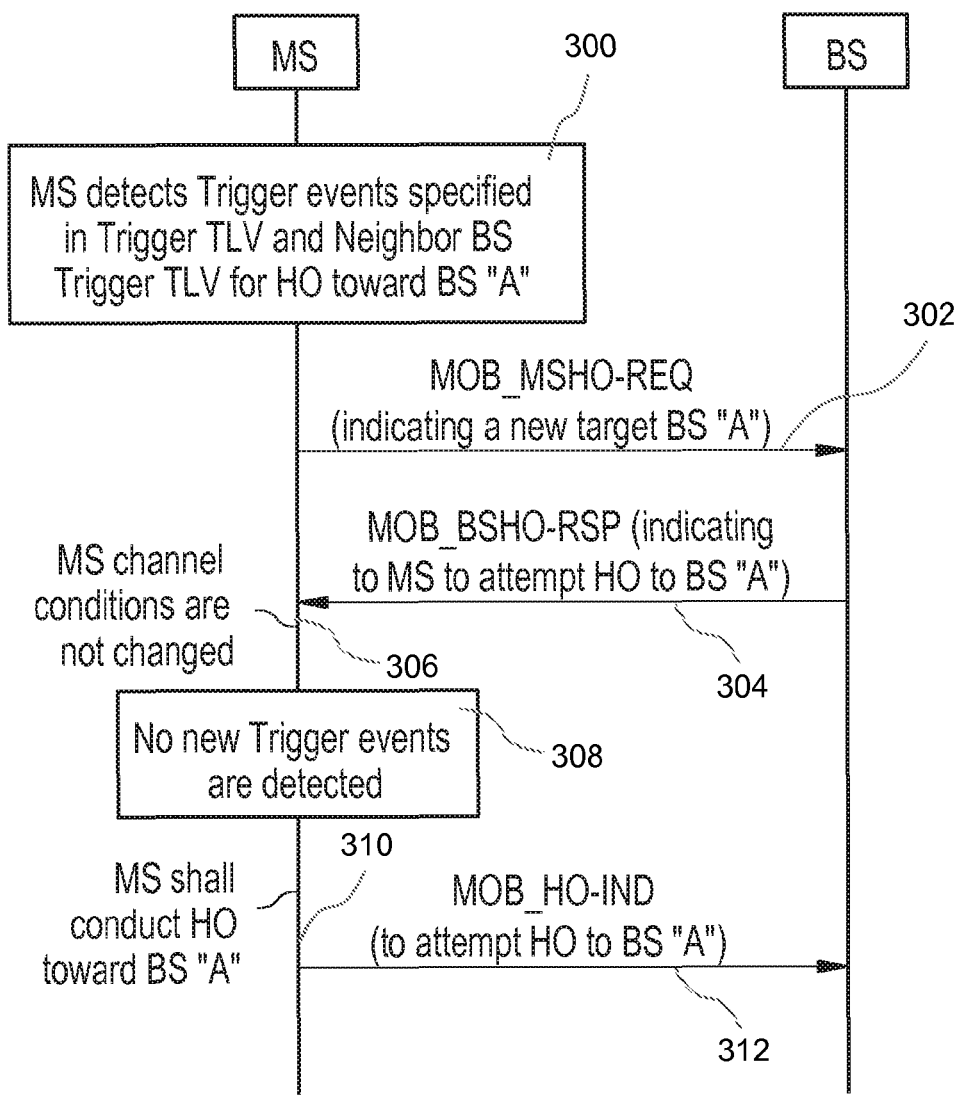

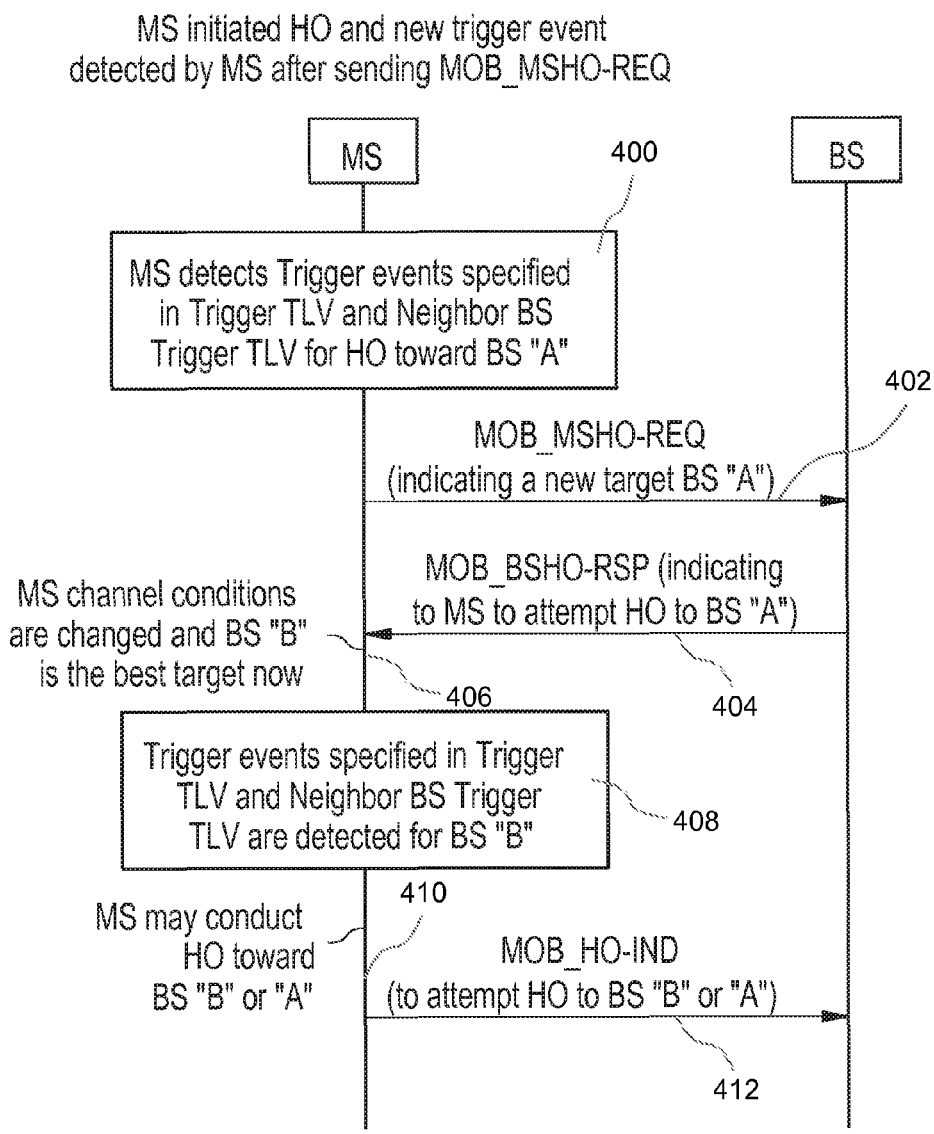

METHOD, SYSTEM AND DEVICES FOR SUPPORTING HANDOVER IN MOBILE COMMUNICATION NETWORKS

FIELD OF THE INVENTION

This disclosure relates to techniques for supporting handover (HO) in mobile communication networks.

This disclosure was devised with specific attention paid to its possible use in Mobile Wireless Broadband Access network conforming to the IEEE 802.16Rev2 specification.

DESCRIPTION OF THE RELATED ART

At present, the IEEE802.16Rev2 specification (IEEE Computer Society and IEEE Microwave Theory and Techniques Society, DRAFT Standard for Local and Metropolitan Area Networks Part 16: Air Interface for Broadband Wireless Access Systems, P802.16Rev2/D1 (October 2007) Revision of IEEE Std 802.16-2004 as amended by IEEE Std 802.16f-2005 and IEEE Std 802.16e-2005) supports both MS (i.e. Mobile Station)-initiated handover and BS (i.e. Base Station)-initiated handover.

However the current specification does not allow using the BS-initiated handover mechanism alone: MS-initiated handover cannot be disabled in the system when BS-initiated handover is used. Also, the MS-initiated handover mechanism always takes precedence in case a MS-initiated handover decision and a BS-initiated handover decision occur at the same time.

OBJECT AND SUMMARY OF THE INVENTION

The behaviour as described above leads to high risk of system instability when a BS-initiated handover feature is enabled in the system.

Different handover algorithms and criteria are typically used at the Base Station (BS) side and at the Mobile Station (MS) side. MS-initiated handover aims at individual link optimisation by taking into account channel quality state at the MS receiver. BS-initiated handover has a wider scope, since the base station can take into account the overall network resources status when taking the handover decision. The base station may typically command handover toward a target BS which is not the best serving cell in order to set free valuable radio resources on the best serving cell (e.g. in case of Underlay/Overlay cell scenario). The mobile station may immediately trigger handover back to the best serving cell and so on.

The Inventors have noted that aforementioned problem has not been solved up to now in the IEEE802.16Rev2 specification i.e. in a mobile communication system supporting both MS-initiated handover and BS-initiated handover. In order to avoid system instability, the need exists of ensuring that MS-initiated handover and BS-initiated handover processes are coordinated.

The object of the invention is thus to provide a satisfactory response to that need.

According to the present invention, that object is achieved by means of a method having the features set forth in the claims that follow.

The invention also relates to a corresponding system, as well as corresponding apparatus (i.e. mobile station/base station) and a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" highlights the possibility for the present invention to be implemented in a distributed/modular fashion.

The claims are an integral part of the disclosure of the invention provided herein.

In an embodiment, a method is proposed to coordinate MS-initiated handover process and BS-initiated handover process, in such a way that the two procedures can be supported together in the system, in a manner which can be defined a "BS-controlled MS-initiated handover".

An embodiment of the solution described herein lends itself to be incorporated in the IEEE802.16Rev2 specification by introducing some modifications in section 6.3.22.2.2 and other related sections thereof.

BRIEF DESCRIPTION OF THE ANNEXED REPRESENTATIONS

The invention will now be described, by way of example only, with reference to the enclosed representations, wherein:

FIG. 1 is a schematic representation of a BS-initiated handover in a mobile communication network with no trigger events detected by a mobile station (MS);

FIG. 2 is a schematic representation of a BS-initiated handover in a mobile communication network in the presence of a trigger event detected by a mobile station;

FIG. 3 is a schematic representation of a MS-initiated handover in a mobile communication network with no new trigger events detected by the mobile station; and FIG. 4 is a schematic representation of a MS-initiated handover in a mobile communication network in the pence of a new trigger event detected by the mobile station.

DETAILED DESCRIPTION OF PREFERRED EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The mechanism underlying the arrangement disclosed herein will be described in the following in connection with FIGS. 1 to 4 by referring to the interplay between a Mobile Station (MS) and a Base Station (BS) in a mobile communication network. The general principles of operation of such a network are well known in the art and do not require to be described in detail herein.

By way of background, the BS may set an MS-initiated handover trigger event via Trigger TLV in DCD message (as described in section 11.4.1 of the IEEE802.16Rev2 specification) or via Neighbor BS Trigger TLV in MOB-NBR-ADV message (as described in section 11.18.2 of the same specification). Trigger TLV and Neighbor BS Trigger TLV allow configuring the conditions under which a HandOver (HO) can be initiated by MS.

In the exemplary embodiment described herein, the HO shall always proceed with a notification through either MOB_MSHO-REQ or MOB_BSHO-REQ messages, so that the MS and BS will in any case share (either via a MOB_BSHO-REQ message sent from the BS to the MS in the case of BS-initiated HO or via a MOB_MSHO-REQ message sent from the MS to the BS in the case of MS-initiated HO) information indicating a target base station for the mobile station to attempt handover.

This is in contrast with the prior art, where notification in case of MS initiated HO (i.e. MOB_MSHO-REQ message) was not mandatory.

MS shall send MOB_MSHO-REQ in case a trigger conditions specified in Trigger TLV or Neighbor BS Trigger TLV has occurred.

MS actual pursuit of HO to one of BSs specified in MOB_BSHO-RSP is required, apart from those cases stated in next paragraph.

MS may decide to attempt HO to a BS not included in MOB_BSHO-RSP, sending a MOB_HO-IND indicating the selected BS, only in case a trigger condition specified in Trigger TLV or Neighbor BS Trigger TLV has occurred for that target BS.

In an embodiment of the arrangement disclosed herein, system behavior in case of handover is as described in the following.

As illustrated in FIG. 1, when the BS detects the need for HO (step 100) HO is initiated by the BS (i.e. in a step 102 the serving BS sends a MOB_BSHO-REQ message indicating a new target BS, e.g. BS "A"). If the MS does not detect trigger conditions for a target BS not included in MOB_BSHO-REQ (i.e. trigger events specified in Trigger TLV and Neighbor BS Trigger TLV are not detected for BSs different from "A"—step 104), then in a step 106 the MS shall conduct HO toward the target BS indicated by the serving BS (i.e. in a step 108 the MS sends an MOB_HO-IND message indicating a BS included in MOB_BSHO-REQ, thus attempting HO to BS "A").

Conversely, as illustrated in FIG. 2, when the BS detects the need for HO (step 200) and HO is initiated by the BS (i.e. in a step 202 the serving BS sends a MOB_BSHO-REQ message indicating a new target BS, e.g. BS "A") and the MS does detect trigger conditions for a target BS not included in MOB_BSHO-REQ (i.e. trigger events specified in Trigger TLV and Neighbor BS Trigger TLV are detected for, say, BS "B", different from "A"—step 204), in a step 206 the MS may conduct HO toward a target BS indicated by the serving BS. Specifically, in a step 208 the MS will send an MOB_HO-IND message either towards a BS included in the MOB_BSHO-REQ message or toward the target BS for which a trigger condition is met (i. e. the MS sends an MOB_HO-IND message indicating the BS for which the trigger condition is met).

FIG. 3 is representative of the case where HO is initiated by the MS, (i.e. in a step 300 the MS detects trigger events specified in Trigger TLV and Neighbor BS Trigger TLV for HO towards BS "A".). When the trigger condition is met, the MS sends an MOB_MSHO-REQ message (step 302) indicating a new target BS (e.g. "A") and receives from the BS (in a step 304) a MOB_BSHO-RSP message indicating to the MS to attempt HO to the BS "A". After receiving the MOB_BSHO-RSP message, if the MS channel conditions are not changed (which is verified in a step 306) and the MS does not detect new trigger conditions (step 308), in a step 310 the MS shall conduct HO toward a target BS for which the trigger condition is met. Specifically, in a step 312 the MS sends an MOB_HO-IND message indicating the BS for which the trigger condition is met.

FIG. 4 refers to the situation where HO is initiated by the MS (i.e. in a step 400 the MS detects trigger events specified in Trigger TLV and Neighbor BS Trigger TLV for HO towards BS "A".) and the trigger condition being met leads to the MS sending (in a step 402) a MOB_MSHO-REQ message indicating a new target BS, say, "A". In a step 404, the BS issues a MOB_BSHO-RSP message indicating to the MS to attempt HO to BS "A". The MS detects (in a step 406) new trigger conditions i.e. the channel conditions are changed and BS "B" is now the best target.

In fact, detection of the new trigger condition may (and typically does) take place even before receiving the MOB_BSHO-RSP message. New trigger conditions can be detected at any time during the time interval between transmission of the MOB_MSHO-REQ message and transmission of the MOB_HO-IND message.

In a step 408 trigger events specified in Trigger TLV and Neighbor BS trigger TLV are detected for BS "B", and the MS may conduct, in a step 410, HO towards either of target BSs "B" or "A". Specifically, step 412 is representative of the MS attempting HO to the BS for which the first trigger condition is met (i.e. the MS sends a MOB_HO-IND message indicating the BS for which the first trigger condition is met) or to the target BS for which the second trigger condition is met (i.e. MS sends a MOB_HO-IND message indicating the BS for which the second trigger condition is met).

It will be appreciated that operation as described in connection with FIGS. 1 to 4 requires—in contrast with the prior art—that transmission of the MOB_HO-IND message is—always—mandatory.

An advantage of the arrangement disclosed herein lies is that it allows Mobile WiMAX systems to support a BS-initiated handover feature without risks of system instability. BS-initiated handover is a basic functionality supporting value added features as Multicarrier networks, Overlay/Underlay cells and Layered networks (micro/macro cells).

Large capacity networks can be obtained by deploying layered network structures. A certain geographical location can be served by signals from few cells presenting different radio channel conditions (e.g. small/large cells, micro/macro cells). In a similar scenario, a MS may regularly tend to select larger cells as a target cell for handover since they provide best radio channel conditions, leaving the smaller cells unloaded. BS-initiated handover can be used to the purpose of distributing traffic load efficiently from network and spectrum resource perspective. The arrangement disclosed herein ensures that the BS-initiated decision is enforced at the MS side and that it is not wiped off by a subsequent decision from the MS to handover back to the old serving cell.

The following is a description of certain proposed modifications which might be introduced in IEEE802.16Rev2 specification to implement an embodiment.

Enhancement of Subsection 6.3.2.3.5, "Ranging request (RNG-REQ) message"

A new parameter BS Controlled_MSHO may be introduced in Table 622 "RNG-REQ" message encodings. The parameter defines if BS Controlled MS-initiated handover is supported by the MS.

Enhancement of Subsection Table 615 "DCD channel encoding"

A new value may be introduced for HO type support TLV. Bit 3 may be named BS_Controlled_MSHO (or BS_Controlled_HO). This flag may be used to indicate support of BS Controlled MSHO mechanism in the cell.

Amendment of Subsection 6.3.22.2.2, "HO decision and initiation"

Certain possible proposed modifications are reported in the following sentences.

In case of MS-initiated HO, HO initiation and notification mode depends on the settings of the BS_Controlled_MSHO (or BS_Controlled_HO) flag in HO type support field of DCD message and on the BS_Controlled_MSHO field in the RNG-REQ message.

In case BS_Controlled_MSHO field is not included in RNG-REQ message, the default value "0" shall be applied.

If BS_Controlled_MSHO flag is set to "0" in HO type support field of DCD message or Value field of BS_Controlled_MSHO in RNG-REQ message is set to "0", the HO may proceed with a notification through either MOB_MSHO-REQ or MOB_BSHO-REQ messages. The HO notification is recommended, but not required. Acknowledgement of MOB_MSHO-REQ with MOB_BSHO-RSP is required.

If BS_Controlled_MSHO flag is set to "1" in HO type support field of DCD message and Value field of BS_Controlled_MSHO in RNG-REQ message is set to "1", HO notification is required. The HO shall proceed with a notification through either MOB_MSHO-REQ or MOB_BSHO-REQ messages. Acknowledgement of MOB_MSHO-REQ with MOB_BSHO-RSP is required. MS shall send MOB_MSHO-REQ only in case a triggering conditions specified in Trigger TLV or Neighbor BS Trigger TLV has occurred.

If BS_Controlled_MSHO flag is set to "0" in HO type support field of DCD message or Value field of BS_Controlled_MSHO in RNG-REQ message is set to "0", MS actual pursuit of HO to one of BSs specified in MOB_BSHO-RSP is recommended, but not required. MS may decide to attempt HO to a different BS that may or may not have been included in MOB_BSHO-RSP.

If BS_Controlled_MSHO flag is set to "1" in HO type support field of DCD message and Value field of BS_Controlled_MSHO in RNG-REQ message is set to "1", MS actual pursuit of HO to one of BSs specified in MOB_BSHO-RSP is required. MS may decide to attempt HO to a BS not included in MOB_BSHO-RSP, sending a MOB_HO-IND indicating the selected BS, only in case a triggering condition specified in Trigger TLV or Neighbor BS Trigger TLV has occurred for that target BS.

If BS_Controlled_MSHO flag is set to "0" in HO type support field of DCD message or Value field of BS_Controlled_MSHO in RNG-REQ message is set to "0", a MS required to conduct HO is not restricted to conducting HO to those BS included in the notifying message. In other words, the MS may attempt HO to a different BS that may or may not have been included in either the MOB_BSHO-REQ or MOB_BSHO-RSP.

If BS_Controlled_MSHO flag is set to "1" in HO type support field of DCD message and Value field of BS_Controlled_MSHO in RNG-REQ message is set to "1", a MS required to conduct HO is restricted to conducting HO to those BS included in the notifying message. In other words, the MS may not attempt HO to a BS not included in the MOB_BSHO-REQ or in the MOB_BSHO-RSP unless a trigger event specified in Trigger TLV or Neighbor BS Trigger TLV is detected for that target BS.

Without prejudice to the underlying principles of the invention, the details and embodiments may vary, even appreciably, with respect to what has been described by way of example only, without departing from the scope of the invention as defined by the annexed claims.

The invention claimed is:

1. A method of coordinating handover of a mobile station (MS) from a serving base station (BS) to a target base station in a mobile communication system supporting both MS-initiated handover and BS-initiated handover, wherein the method includes:

in the case of BS-initiated HO, said base station (BS) sending to the mobile station (MS) or, in the case of MS-initiated HO, said mobile station (MS) sending to the base station (BS), a message (MOB_BSHO-REQ; MOB_MSHO-REQ) indicating a target base station for the mobile station (MS) to attempt a handover;

both in the case of BS-initiated handover and in the case of MS-initiated handover, said mobile station (MS) sending an information message (MOB_HO-IND) indicating the base station to which the handover was attempted;

said serving base station (BS) sending to the mobile station (MS) an indication message (MOB_BSHO-REQ; MOB_BSHO-RSP) indicating a target base station for the mobile station (MS) to attempt handover;

checking if handover trigger events are detected for base stations different from said target base station indicated in said indication message (MOB_BSHO-REQ; MOB_BSHO-RSP);

if no such trigger events are detected, said mobile station (MS) attempting the handover to said target base station indicated in said indication message (MOB_BSHO-REQ; MOB_BSHO-RSP); and if any such trigger events are detected for a target base station different from said target base station indicated in said indication message (MOB_BSHO-REQ; MOB_BSHO-RSP), said mobile station (MS) attempting the handover to said different target base station (B) for which trigger events were detected.

2. The method of claim 1, including, in the case of MS-initiated handover:

said mobile station (MS) sending to said serving base station (BS) a notification message (MOB_MSHO-REQ) indicating a target base station for which handover trigger events were detected, and said base station (BS) sending to the mobile station (MS), in response to said notification message (MOB_MSHO-REQ), said indication message (MOB_BSHO-RSP).

3. The method of claim 1, wherein said checking for trigger events is at said mobile station (MS).

4. The method of claim 1, wherein said mobile communication system is a IEEE802.16Rev2-based system.

5. The method of claim 4, wherein said message indicating a target base station for the mobile station (MS) to attempt handover is a MOB_BSHO-REQ message in the case of BS-initiated handover and a MOB_MSHO-REQ message in the case of MS-initiated handover, respectively.

6. The method of claim 4, wherein said information message is a MOB_HO-IND message.

7. A mobile station (MS) for a communication system supporting both MS-initiated handover and BS-initiated handover from a serving base station (BS) to a target base station, wherein the mobile station (MS) is configured:

to send, in the case of MS-initiated handover, a notification message (MOB_MSHO-REQ) indicating a target base station for which handover trigger events were detected;

and, both in the case of BS-initiated handover and in the case of MS-initiated handover, an information message (MOB_HO-IND) indicating the base station to which handover was attempted, wherein the mobile station (MS) is further configured:

to receive from said serving base station (BS) an indication message (MOB_BSHO-REQ; MOB_BSHO-RSP) indicating a target base station for the mobile station (MS) to attempt handover;

to check if handover trigger events are detected for base stations different from said target base station indicated in said indication message (MOB_BSHO-REQ; MOB_BSHO-RSP);

if no such trigger events are detected, to attempt a handover to said target base station indicated in said indication message (MOB_BSHO-REQ; MOB_BSHO-RSP); and if any such trigger events are detected for a target base station different from said target base station indicated in said indication message (MOB_BSHO-REQ; MOB_BSHO-RSP), to attempt to handover to said different target base station for which trigger events were detected.

8. The mobile station of claim 7, configured for performing said checking for trigger events.

9. The mobile station of claim 7, wherein said mobile communication system is a IEEE802.16Rev2-based system.

10. The mobile station of claim 9, wherein said notification message is a MOB_MSHO-REQ message.

11. The mobile station of claim 9, wherein said information message is a MOB_HO-IND message.

12. The mobile station of claim 7, wherein said mobile communication system is a IEEE802.16Rev2-based system, and wherein said indication message is a MOB_BSHO-REQ message in the case of BS-initiated handover and a MOB_BSHO-RSP message in the case of MS-initiated handover, respectively.

13. A base station (BS) for a communication system supporting both MS-initiated handover and BS-initiated handover from a serving base station (BS) to a target base station, wherein the base station (BS) is configured for receiving, in the case of MS-initiated handover, a notification message (MOB_MSHO-REQ) indicating a target base station for which handover trigger events were detected;

for receiving from said mobile station (MS), both in the case of BS-initiated handover and in the case of MS-initiated handover, an information message (MOB_HO-IND) indicating the base station to which handover was attempted;

for sending an indication message (MOB_BSHO-REQ; MOB_BSHO-RSP) indicating a target base station for the mobile station (MS) to attempt a handover;

wherein the handover was attempted to a different target base station, if the handover trigger events are detected by the mobile station for said different target base station than said target base station indicated in said indication message (MOB_BSHO-REQ; MOB_BSHO-RSP), and, if no such trigger events are detected by the mobile station, attempting a handover to said target base station indicated in said indication message (MOB_BSHO-REQ; MOB_BSHO-RSP).

14. The base station (BS) of claim 13, configured for performing, in the case of MS-initiated handover, the operations of:

receiving from a mobile station (MS) in said system a notification message (MOB_MSHO-REQ) indicating a target base station for which handover trigger events were detected, sending to said mobile station (MS), in response to said notification message (MOB_MSHO-REQ), an indication message (MOB_BSHO-REQ; MOB_BSHO-RSP) indicating a target base station for said mobile station (MS) to attempt handover; and receiving from said mobile station (MS), in response to said indication message (MOB_MSHO-REQ; MOB_BSHO-RSP), an information message (MOB_HO-IND) indicating a target base station different from said target base station indicated in said indication message (MOB_BSHO-REQ; MOB_BSHO-RSP), said mobile station (MS) attempting handover to said different target base station.

15. The base station of claim 13, wherein said mobile communication system is a IEEE802.16Rev2-based system.

16. The base station of claim 15, wherein said information message is a MOB_HO-IND message.

17. The base station of claim 14, wherein:

said mobile communication system is a IEEE802.16Rev2-based system;

said notification message is a MOB_MSHO-REQ message, and said indication message is a MOB_BSHO-REQ message in the case of BS-initiated handover and a MOB_BSHO-RSP message in the case of MS-initiated handover.

* * * * *